Patented Oct. 8, 1935

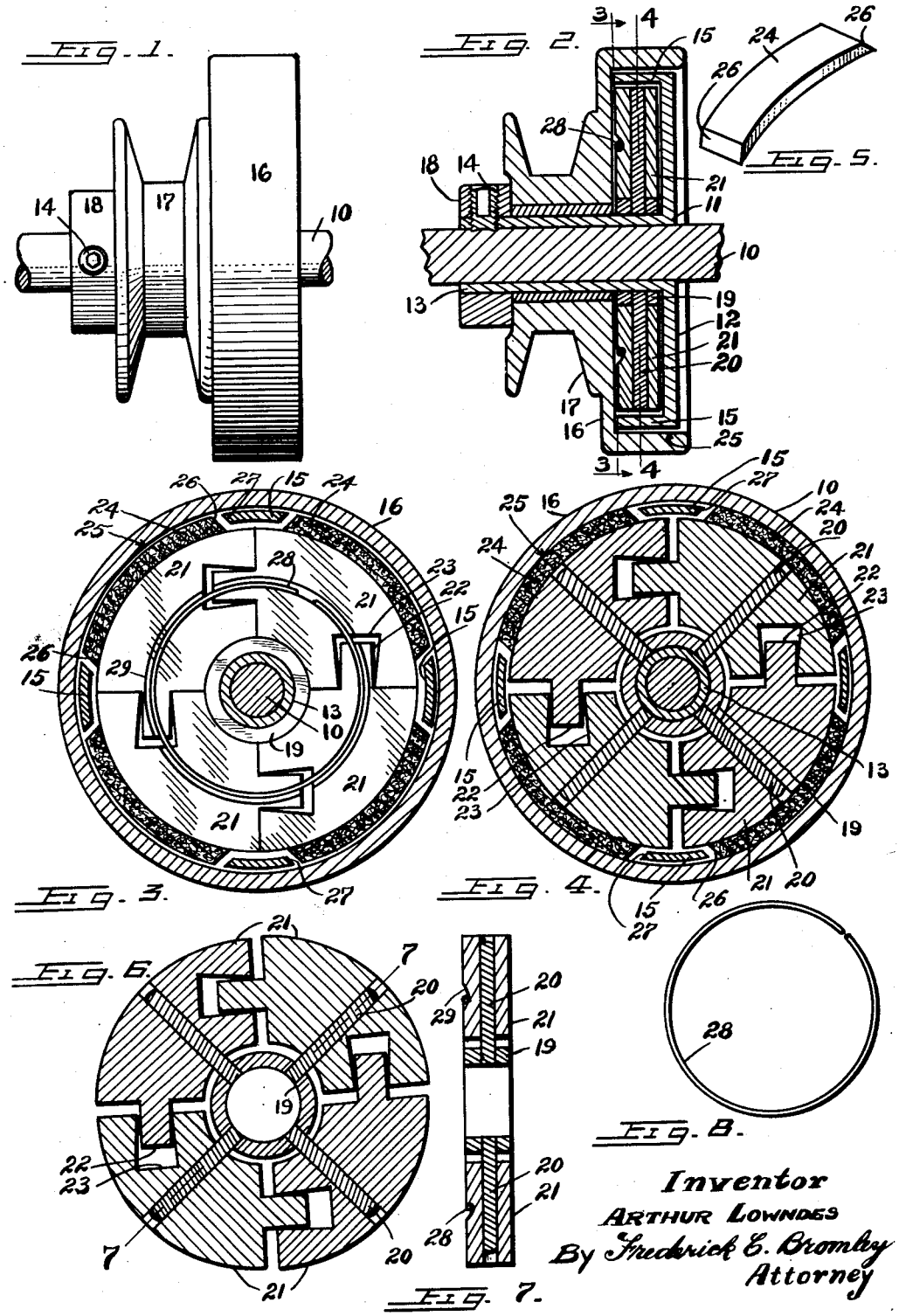

2,016,643

UNITED STATES PATENT OFFICE 2,016,643

CENTRIFUGAL CLUTCH

Arthur Lowndes, Toronto, Ontario, Canada

Application August 14, 1930, Serial No. 475,192
Renewed February 28, 1935

4 Claims. (Cl. 192—105)

The invention relates to improvements in centrifugal clutches as described in the present specification and shown in the accompanying drawing that forms part of the same.

The invention appertains to the class of friction clutch in which the rotation of the driving part is utilized for inducing one or more elements to apply the clutching pressure through centrifugal force.

The general object of the invention is to produce an efficient and serviceable clutch for relieving shock and strain attendant upon the sudden picking up of a load.

More particularly however the aim of the invention is to produce a centrifugal clutch that has a retarded engagement which renders it particularly suitable for use in conjunction with "split-phase" electric motors. The delayed action of the clutch permits the motor to attain its full speed and throw out the starting winding before the clutch is engaged. This not only greatly reduces the required starting current but also produces a quieter and cooler running motor.

With these main objects and advantages in view, others will be manifest as the description proceeds.

Referring to the accompanying drawing, Figure 1 is a side elevation of the clutch.

Figure 2 is an axial sectional view thereof.

Figure 3 is a transverse section taken on the line 3—3 of Figure 2.

Figure 4 is a transverse section taken on the line 4—4 of Figure 2 illustrating the pressure blocks expanded to engage the friction shoes.

Figure 5 is a perspective view of one of the friction shoes.

Figure 6 is a transverse section of the pressure blocks mounted upon a floating ring and expanded as in Figure 4.

Figure 7 is a sectional detail taken on the line 7—7 of Figure 6.

Figure 8 is a detail of a spring ring for contracting the pressure blocks.

Like numerals of reference indicate corresponding parts in each figure throughout the drawing.

In the preferred embodiment of the invention illustrated in the drawing, the reference numeral 10 indicates the shaft extending from the prime mover or other power transmitting element. Fixedly secured on the shaft is the driving element 11 of the clutch, which in the present instance is shown as a disk 12 integral with a central boss 13 fitted over the shaft 10 and secured to it by the set screw 14. The disk portion 12 has inwardly projecting lugs 15 constituting driving dogs as hereinafter more fully explained.

The driven element 16 is in the form of a drum rotatably mounted upon the boss portion 13 of the driving element 11. This construction however is only given by way of illustration but not of limitation. The drum may have some means of directly taking power off it, such as the pulley 17; this, however, is obviously not essential as it could be otherwise constructed and arranged.

The collar 18 restricts endwise movement of the drum and is secured by the set screw 14 aforesaid.

Freely mounted upon the boss 13 of the driving element 11 is a ring 19, the lateral movement of which is limited on one side by the drum and on the other side by the disc 12. This floating ring has pins 20 rigidly secured in it and radially directed, which pins are equally spaced around the ring and correspond in number to the complement of pressure blocks 21 through which they project. The pins constitute pilots that function to attach the blocks to the ring so that they are free to move radially.

Each block is a segment of a ring that encompasses the floating ring 19 and forms therewith a floating unit that has no physical connection with either the driving element or the driven element. When contracted the segments abut the floating ring 19, and when expanded do not interfere with the driving dogs 15.

The blocks preferably have some means whereby they act in unison, such as interfitting elements consisting of projections 22 lodged in recesses 23. The means illustrated exemplifies one known mode of carrying this out and may of course be varied without affecting the invention.

24 designates the friction shoes which are disposed between the driving dogs 15 and have contiguous engagement with the pressure blocks 21. The friction shoes are preferably constructed of a material widely employed for lining clutches and brakes. Each shoe is curved lengthwise to conform to the contact face 25 of the drum and the ends 26 are preferably inclined as shown.

The driving dogs 15 have their ends 27 inclined to conform to the ends of the shoes. By this construction the resultant wedging action tends to force the shoes away from the contact face 25 of the drum. This is advantageous as it assists in freeing the shoes from the driven element directly the pressure blocks contract.

The invention operates as follows:

During the initial rotation of the driving element 11 the inertia of the pressure blocks 21 causes the floating ring 19 to lag, which it is free to do by reason of its frictional mounting on the boss 13. Therefore at the start the floating ring unit does not revolve at the same speed as the driving member. Consequently the centrifugal force is insufficient to throw the segmental block outwardly. Gradually, however, the angular velocity of the blocks increases due to frictional contact. When sufficient speed is attained the blocks expand under centrifugal force and press the shoes into frictional contact with the drum. Once the shoes contact with the drum the blocks are carried along with the driving element as a unit, thus producing sufficient pressure to enable the shoes to grip the drum.

From the preceding description it should be clearly understood that the chief characteristic of the invention lies in its frictionally driven pressure blocks which owing to the small diameter and area of contact with the driving element rotate but slowly at first until sufficient momentum is obtained to throw out the blocks which are then driven at increased speed due to their comparatively large peripheral contact with the friction shoes.

In practice it has been found expedient to employ a spring ring 28 to contract the pressure blocks in disengaging the clutch. The ring is seated in a groove 28 cut or otherwise formed in one side of the ring composed of the blocks. This spring ring also serves to increase the lag and its tension may be varied for this purpose.

It will be manifest that various changes may be resorted to without departing from the spirit and scope of the invention, such, for instance, as to increase the weight of the friction shoes and proportionately decrease the weight of the pressure blocks with a view to giving the clutch a longer starting period.

What I claim is:

1. A centrifugal clutch consisting of a driving member, a driven member, a complement of floating friction elements for engagement with said driven member, dogs rigidly projecting from the driving member for abutting engagement with said friction elements, the engaging faces of said dogs and said friction elements being so inclined as to tend to free the friction elements from the driven member, and means adapted to be revolved by frictional contact with the driving member in order to apply pressure on the friction elements by centrifugal force.

2. A centrifugal clutch consisting of a driving member, a driven member, a complement of friction elements for engagement with said driven member, a driving connection between said driving member and the friction elements, a complement of blocks disposed about the axis of rotation and engaged with said friction elements, said blocks being provided with radial holes, a ring journalled upon the driving member, pins radially projecting therefrom and slidably fitting in the holes of the blocks to support them around the ring, and means applying pressure upon the blocks to retard their outward movement under centrifugal force, said blocks presenting a mounting for the friction elements.

3. A centrifugal clutch consisting of a disk and a central boss thereon constituting a driving member, a drum, a complement of arcuate friction elements for engagement with said drum, driving dogs projecting from said disk and fitting between the friction elements, a complement of segmental blocks composing a ring supporting the friction elements, said blocks being provided with radial holes and interfitting elements to secure the block against relative displacement, a ring journalled upon the boss of the driving member, pins radially projecting therefrom and slidably fitting in the holes of the blocks, and a spring ring applying pressure upon the blocks to retard their outward movement under centrifugal force.

4. A centrifugal clutch consisting of a driving member, a driven member, a complement of friction elements for engagement with said driven member, a driving connection for the friction elements such that the friction elements are rotated in synchronism with the driving member, a complement of blocks disposed about the axis of rotation and engaged with said friction elements, said blocks being provided with radial holes and interfitting elements to secure the blocks against relative displacement, a ring mounted upon the driving member, pins radially projecting therefrom and slidably fitting in the holes of the blocks to support them around the ring, and means applying pressure upon the blocks to retard their outward movement.

ARTHUR LOWNDES.